ALTERATION OF A SIGNAL'S CROSS OVER POINT TO EFFECT PHASE SHIFT

Filed March 18, 1965

INVENTOR.
WESLEY C. SEWELL

BY *Bruce C. Lutz*

ATTORNEY 3,329,888
ALTERATION OF A SIGNAL'S CROSS OVER POINT TO EFFECT PHASE SHIFT

Wesley C. Sewell, St. Petersburg, Fla., assignor to Honeywell Inc., Minneapolis, Minn., a corporation of Delaware Filed Mar. 18, 1965, Ser. No. 440,898
7 Claims. (Cl. 323—101)

The present invention pertains generally to phase shifting means and more specifically to a phase shifter which will very accurately, through the use of feedback, maintain a desired amount of phase shift such as 90°.

This is accomplished by feeding an input signal to a circuit which will generally shift the phase of the signal approximately the desired amount. This signal is then detected as to its cross over points with respect to a reference potential and an output signal is obtained which is indicative in its rise and fall times of the cross over points of the original signal. The output is then compared with the input signal and a feedback signal is obtained if the phase of the input and output signals is other than the desired amount. This feedback signal is then added to the originally phase shifted signal to alter the cross over points of the signal as phase shifted. This alteration then alters the exact rise and fall times of the output signal so as to maintain the desired amount of phase shift between the input and the output.

It is therefore an object of this invention to provide a new and novel method of phase shifting a sginal.

It is a further object of this invention to provide more accurate means for phase shifting a signal and maintaining this phase shift at a desired amount.

Further objects and advantages of this invention will be apparent from a reading of the specification and appended claims in conjunction with the drawings of which:

Figure 1:
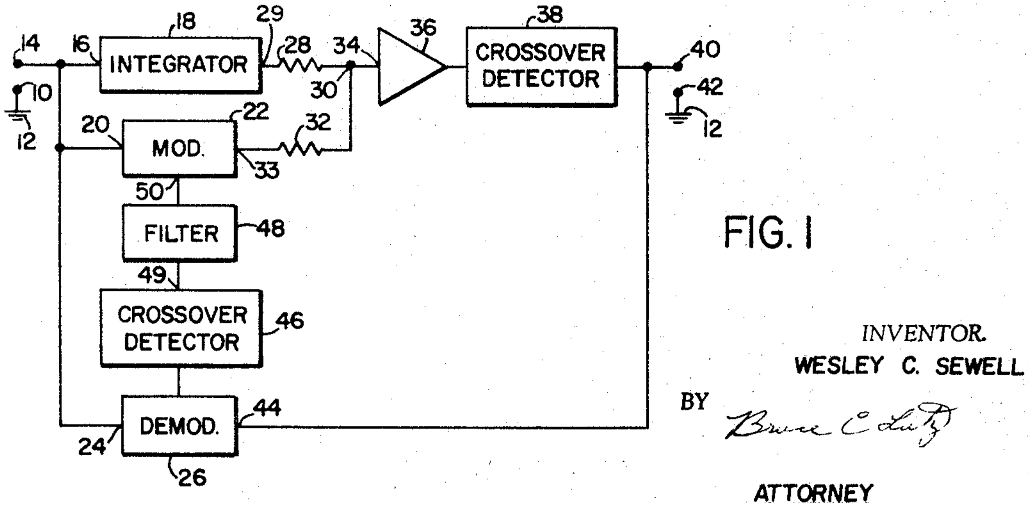
FIGURE 1 is a block diagram of the phase shifting circuit.

In FIGURE 1 a first input terminal 10 is connected to ground or reference potential 12. While reference potential 12 is not shown connected to any of the other block diagrams in the circuit it will be realized that most or at least many of the other blocks will need some sort of connection to ground or reference potential. Each of these blocks will also need a connection to some source of power which also is not shown in this figure as it is believed to be unnecessary for the purpose of illustrating the invention. A second input terminal 14 of the phase shifting apparatus is connected to an input 16 of an integrating means or signal converting circuit means 18. Input terminal 14 is also connected to an input 20 of a modulating means which in this circuit may be an amplitude modulator 22 and to an input 24 of a logic means, demodulating means or phase comparing network means 26. A resistive means, impedance means, or summing means 28 is connected between an output 29 of integrating means 18 and a summing point or junction point 30. A resistive means, impedance means, or summing means 32 is connected between an output 33 of modulator 22 and the junction point 30. Junction point 30 is connected to an input 34 of an amplifying means or summing amplifier means 36. The output of summing amplifier 36 is connected to an input of a cross over detector, line crossing detector, or signal converting means 38. An output of cross over detector 38 is connected to an output 40 of the phase shifting apparatus. A second output 42 of the phase shifting apparatus is connected to reference potential 12. Output 40 is also connected to a second input 44 of the demodulating circuit 26. An output of demodulator 26 is connected to a cross over detection means, line crossing detection means, or signal converting means 46. Cross over detector 46 may be quite similar to cross over detector 38 if it is so desired. A filter 48 is connected between an output 49 of cross over detector 46 and a second input 50 of modulating means 22.

Figure 2:
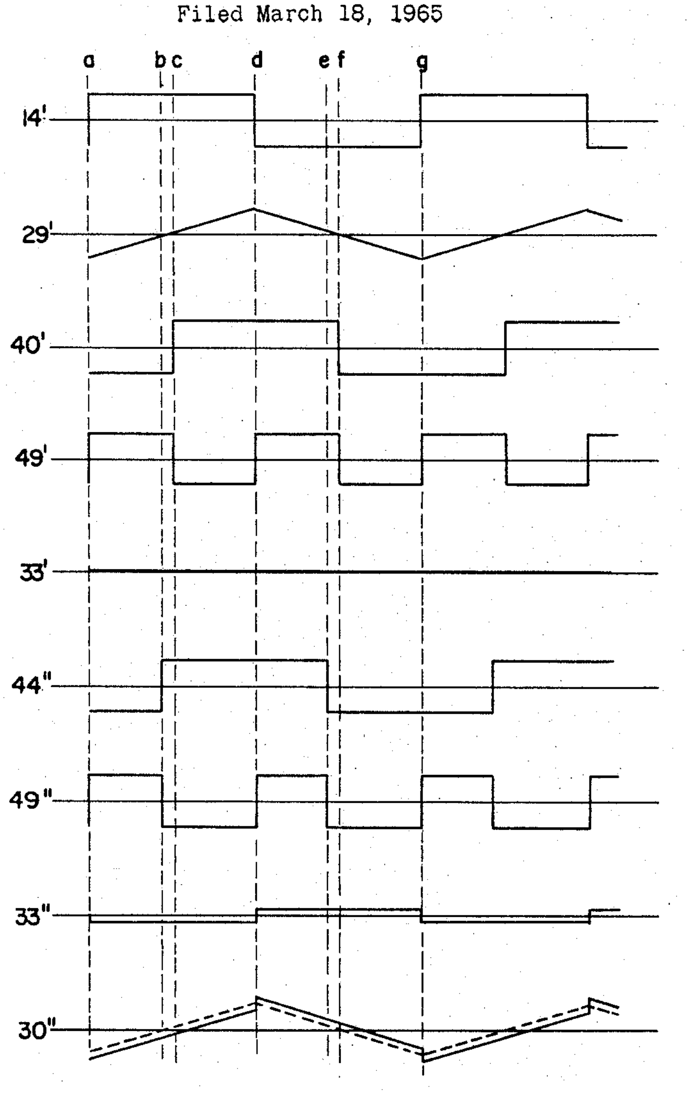
FIGURE 2 is a graph showing waveforms at various points within the circuit of FIGURE 1.

In FIGURE 2 the waveforms 14′ and 29′ illustrate the waveforms found at the points 14 and 29 in FIGURE 1. The waveforms 40′, 49′ and 33′ illustrate the outputs obtained at the corresponding points in FIGURE 1 when there is no error internal to the circuit of FIGURE 1 in producing the phase shift from input to output of the apparatus. The same numbers are double primed to illustrate the waveforms found at the various points when some internal error causes a phase shift between input and output of the apparatus so that the feedback components comprising demodulator 26, detector 46, filter 48, and modulator 22 are brought into action to stabilize the amount of phase shift. The letters *a–g* are used to designate various points in the waveforms. *a* and *g* are used to designate the rise times or zero electrical degree condition of the input signal 14′. *d* is used to designate the fall times or 180° condition. The points *a*, *d*, and *g* also represent the maximum amplitude conditions of the triangular waveform 29′. Points *c* and *f* are intermediate the extremities of the square wave 14′ and constitute 90 and 270 electrical degrees respectively. These points also represent the point at which the triangular waveform 29′ changes polarity. Point *b* represents the rise time of wave 44″ while point *e* represents the fall times of the same waveform. Points *b* and *e* are slightly leading or ahead of time with respect to points *c* and *f* in FIGURE 2. As defined in this application, a "square wave signal" is any which shifts abruptly from one voltage level to another to form a square or rectangular pattern when signal amplitude is plotted against time as is done with several of the waveforms such as 14′. As will be realized the waveforms are somewhat exaggerated for the feedback condition and could be obtained only by breaking the feedback loop and feeding a separate signal input 44 of demodulator 26 which would indicate that the output 40 had changed. This situation occurs because, with the high gain amplifier 36 which would normally be used, any change in the predetermined phase shift between input 14 and output 40 would immediately be detected and corrected and therefore the output at 40 could never become more than a minute amount away from the desired phase shift.

For an initial discussion of the operation it will be assumed that there are no internal errors and that the integrating circuit 18 phase shifts the input signal exactly 90°. If a square wave input is used, the integrator will produce a triangular shaped waveform such as shown by 29′ in FIGURE 2. The triangular waveform will change from negative polarity to positive polarity at the point designated as *c* in the timewise variation of the diagram. This point is called the cross over point. The signal shown as 29′ as amplified by amplifier 36 and the cross over detector 38 switches at the cross over points of signal 29′ to produce a signal shown as 40′. Since under the assumed conditions signal 40′ is exactly 90° out of phase with respect to signal 14′, these two signals, when applied to demodulator 26, will produce no output. Although it is stated that the demodulator 26 will produce no output, in actuality it will produce a symmetrical alternating output such as shown by waveform 49′. The term "no output" means no effective direct voltage output. This output will however change in amplitude and therefore is applied to the cross over detector 46 which will provide a constant amplitude output signal. The filter 48 will then filter out the alternating component of signal 49′ and produce a zero direct voltage output and apply this to modulator 22. With no input voltage at input 50, the modulator 22 will fail to produce an output voltage and therefore the original triangular waveform 29′ will not be affected.

As previously mentioned the output shown by waveform 40′ will never vary very far from 90° with respect to the input shown in the waveforms and therefore a showing cannot be made unless it is very exaggerated with respect to actual conditions. It will be assumed that the feedback condition from 40 to 44 is broken and that a signal 44″ is applied to input 44 of demodulator 26. The signal 44″ is representative of a variation in output from a 90° phase shift previously shown as 40′. This will cause demodulator 26 to produce an output similar to that shown as 49″. Since a demodulator produces an output which is both amplitude modulated and pulse width modulated, it is necessary to use cross over detector 46 to limit this output to the constant amplitude shown in waveform 49″ for most accurate results. When this signal is applied through filter 48, a direct current output is obtained (not shown) which is applied to modulator 22 to allow a portion of the input signal 14′ to be passed through modulator 22. This portion, which is allowed to be passed through, is shown as 33″ in FIGURE 2. The signal 33″ is added or summed to the triangular waveform 29′ to produce a composite signal represented by solid line waveform 30″. For ease of illustration the original triangular waveform is shown in dashed lines in the column containing waveform 30″ so that it can be seen that the waveform 33″ is added thereto. It will be noted that while the triangular waveform crosses the zero axis at point *c* in time, the altered waveform shown in solid lines does not cross the zero axis at point *c*. In a closed system, this will cause the cross over detector 38 to produce the properly phase shifted output and alter waveform 40″ (actually 44″) back to the proper amount. The error in phase shifting may come from any of the individual elements in the phase shifting apparatus due to ageing, frequency response, temperature, etc. However, through the use of the feedback circuitry shown it does not make any difference where the error is obtained since once the circuit is set at a predetermined phase shift, it will maintain this phase shift through the feedback action.

If it is desired that a phase shift other than 90° be obtained, a biasing signal can be introduced into the feedback network at some point such as the input 50 to modulator 22 so as to change the point in the electrical cycle wherein zero output will be obtained from modulator 22. Although the circuit has been shown with square waves such as 14′, it will be realized that the circuit can operate equally well with other waveforms such as sine waves. When a sine wave is integrated it will become a cosine wave and a modulated amplitude sine wave from modulator 22 will alter the phase of the cosine wave applied to the input of amplifier 36. Using sine waves, the cross over detector 38 could probably be eliminated. However, if it were used, a cross over detector would detect cross over points of the sine wave and have a filter in the output so as to reconvert the square wave to a sine wave.

While only one embodiment has been shown and a second briefly described using sine waves, it will be realized that many modifications may be made to the circuit by those skilled in the art and still stay within the scope and spirit of the invention. The various boxes which are labeled in FIGURE 1 are all standard circuits and may be found in various places. Cross over detector 38 may be some device such as a Schmitt trigger or it may be a somewhat more sophisticated device such as shown in Patent No. 3,225,216 issued Dec. 21, 1965 to John H. Grabowski and assigned to the same assignee as the present invention.

While specific words and phrases have been used in describing the various portions of the circuit it is to be realized that these are not limiting but merely descriptive and I wish to be limited only by the appended claims in which I claim:

1. Phase shifting means comprising, in combination:
apparatus input means for accepting an input first signal;
apparatus output means for supplying an output second signal, said second signal being phase shifted substantially ninety degrees with respect to said first signal;
summing amplifier means including input means and output means;
integrating means connected to said apparatus input means for receiving said first signal therefrom and connected to said input means of said summing amplifier means for supplying a third signal thereto which is an integrated function of said first signal;
cross over detector means connected to said output means of said summing amplifier means for receiving signals therefrom, said cross over detector providing said output second signal to said apparatus output means, said second signal changing amplitude at times indicative of the time of change of polarity with respect to a reference potential of the signal received;
demodulating means connected to said apparatus input means and to said apparatus output means for receiving said first and second signals therefrom, said demodulating means also including output means for providing a pulse width modulated output fourth signal which is symmetrical when the input signals to said demodulating means are 90° out of phase and which linearly changes toward a direct voltage signal when said first and second signals are in phase;
filter means for providing an output fifth signal which is indicative of a unidirectional component of any signals received;
means connecting said output means of said demodulating means to said filter means for supplying said fourth signal thereto;
modulating means connected to said apparatus input means and to said filter means for receiving said first and fifth signals therefrom respectively, said modulating means including output means for supplying an output sixth signal which is amplitude modulated by said fifth signal; and
means connecting said output means of said modulating means to said input means of said summing amplifier means for supplying said sixth signal thereto to modify the signal received by said cross over detector means whereby the points in time at which a change in polarity with respect to the reference potential occurs are altered and thereby alters the phase of said second signal toward 90° with respect to said first signal.

2. Phase shifting means comprising, in combination:
apparatus input means for accepting an input first signal;
apparatus output means for supplying an output second signal, said second signal being phase shifted with respect to said first signal;
summing amplifier means including input means and output means;
integrating means connected to said apparatus input means for receiving said first signal therefrom and connected to said input means of said summing amplifier means for supplying a third signal thereto which is an integrated function of said first signal;
cross over detector means connected to said output means of said summing amplifier means for receiving signals therefrom, said cross over detector providing said output second signal to said apparatus output means, said second signal changing amplitude at times indicative of the time of change of polarity with respect to a reference potential of the signal received;

logic means connected to said apparatus input means and to said apparatus output means for receiving said first and second signals therefrom, said logic means also including output means for providing a pulse width modulated output fourth signal at said output means thereof which is symmetrical when the input signals thereto are of a first given phase relationship, and which changes toward a direct voltage signal when said first and second signals are of a second given phase relationship;

filter means for providing an output fifth signal which is indicative of a unidirectional component of any signals received;

means connecting said output means of said logic means to said filter means for supplying said fourth signal thereto;

modulating means connected to said apparatus input means and to said filter means for receiving said first and fifth signals therefrom, said modulating means including output means for supplying an output sixth signal which is amplitude modulated by said fifth signal; and means connecting said output means of said modulating means to said input means of said summing amplifier means for supplying said sixth signal thereto to modify the signal received by said cross over detector means whereby the points in time at which a change in polarity with respect to reference potential occurs are changed to thereby alter the phase of said second signal toward a predetermined angle with respect to said first signal.

3. Phase shifting means comprising, in combination:

apparatus input means for accepting an input first signal;

apparatus output means for supplying an output second signal, said second signal being phase shifted substantially 90° with respect to said first signal;

summing means including input means and output means;

phase shifting means connected to said apparatus input means for receiving said first signal therefrom and connected to said input means of said summing means for supplying a third signal thereto which is a phase shifted function of said first signal;

detector means connected to said output means of said summing means for receiving signals therefrom, said detector providing said output second signal to said apparatus output means, said second signal changing amplitude at times indicative of the time of change of polarity of the signal received;

comparing means connected to said apparatus input means and to said apparatus output means for receiving said first and second signals therefrom, said comparing means also including output means for providing a fourth signal at said output means which is symmetrical when the input signals to said comparing means are of a first phase and which changes toward a direct voltage signal when said first and second signals are of a second phase;

first means for provinding an output fifth signal which is indicative of a unidirectional component of any signals received;

means connecting said output means of comparing means to said first means for supplying said fourth signal thereto;

modulating means connected to said apparatus input means and to said first means for receiving said first and fifth signals therefrom, said modulating means including output means for supplying an output sixth signal which is modulated by said fifth signal; and second means connecting said output means of said modulating means to said input means of said summing means for supplying said sixth signal thereto to modify the signal received by said detector means whereby the points in time at which a change in polarity occurs are changed to thereby alter the phase of said second signal toward a predetermined phase with respect to said first signal.

4. Phase shifting apparatus for shifting the phase of an input signal comprising, in combination:

integrating means for phase shifting an input signal a given amount;

apparatus input means connected to said integrating means for supplying the input signal therto;

summing means connected to said integrating means for receiving at a first input means a signal which is phase shifted with respect to said input signal, said summing means also including a second input means;

apparatus output means connected to said summing means to receive a composite signal therefrom and to supply an output signal of a predetermined phase relationship with respect to the input signal; and feedback means connected to said apparatus input and output means and to said second input means of said summing means, said feedback means comparing the phase of said input and output signals and supplying a feedback signal to said second input means of said summing means when said input and output signals vary from said predetermined phase relationship to alter the phase of said output signal back toward the predetermined relationship with respect to the input signal supplied by said apparatus input means.

5. Phase shifting apparatus for shifting the phase of an input signal comprising, in combination:

signal converting means for phase shifting an input signal a given amount;

apparatus input means connected to said signal converting means for supplying the input signal thereto;

summing means connected to said signal converting means for receiving a phase shifted signal therefrom at a first input means, said summing means also including a second input means;

apparatus output means connected to said summing means to receive a summed signal therefrom and to supply an output signal of a predetermined phase relationship with respect to the input signal; and feedback means connected to said apparatus input and output means and to said second input means of said summing means, said feedback means comparing the phase of said input and output signals and supplying a feedback signal to said second input means of said summing means when said input and output signals vary from said predetermined phase relationship to alter the phase of said output signal back toward the predetermined relationship with respect to the input signal supplied by said apparatus input means.

6. Phase shifting apparatus comprising:

(a) an amplifier having input means and output means;

(b) a signal converting means;

(c) means for altering the amplitude of signals passing therethrough in response to a control input;

(d) means for connecting said signal converting means and said last named means in electrical parallel;

(e) apparatus input means;

(f) means for connecting said parallel connections of said signal converting means and said means for altering the amplitude to said apparatus input means and to said input means of said amplifier;

(g) apparatus output means; and (h) means connecting said output of said amplifier to said apparatus output means, a signal at the control input of the means for altering the amplitude controlling the phase shift of any signal appearing at the apparatus output means with respect to the signal at the apparatus input means.

7. The apparatus of claim 6 also including:

(i) phase comparing means having a first and a second input and an output;

(j) means connecting the first input of the comparing means to the apparatus input means and the second input of the comparing means to the apparatus output means;

(k) means connecting the output of the comparing means to the control input of the means for altering the amplitude, whereby the output from the comparing means provides the necessary control signal input to the means for altering the amplitude.

References Cited

UNITED STATES PATENTS

| | | | |
|---|---|---|---|
| Re. 24,240 | 11/1956 | Canfora | 318—20.370 |
| 2,576,499 | 11/1951 | Bowes | 323—101 |
| 3,084,320 | 4/1963 | Hoffman et al. | 323—106 |

FOREIGN PATENTS

| | | |
|---|---|---|
| 853,960 | 11/1960 | Great Britain. |

JOHN F. COUCH, *Primary Examiner.*

A. D. PELLINEN, *Assistant Examiner.*